Oct. 3, 1950     T. P. BACON, JR     2,524,156
CURING TUBE PROTECTOR
Filed Nov. 22, 1947
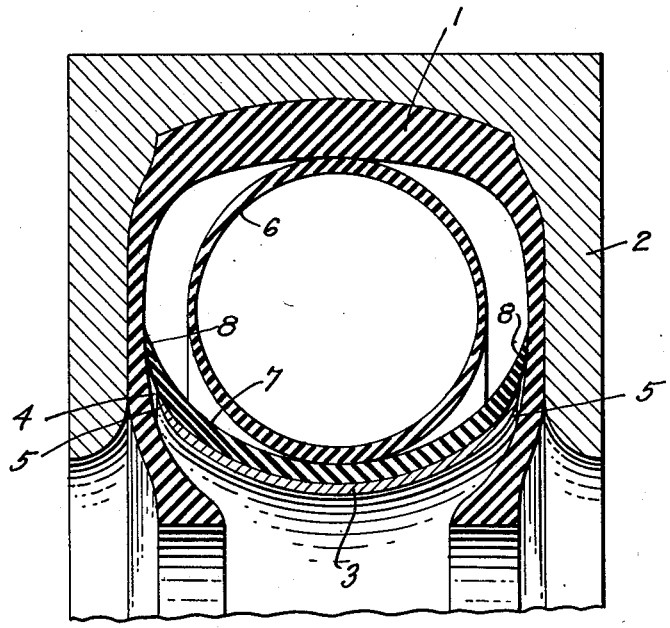
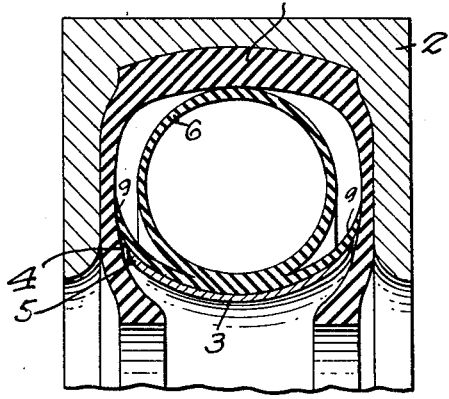 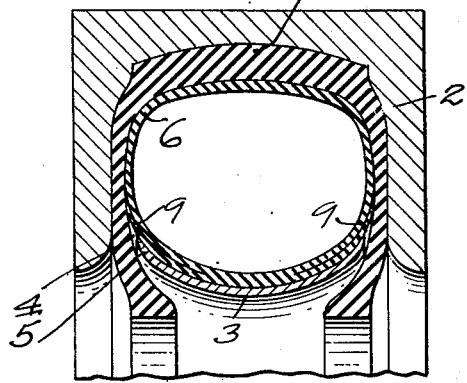
INVENTOR.
THOMAS P. BACON, JR.
BY George B White
ATTORNEY Patented Oct. 3, 1950

2,524,156

UNITED STATES PATENT OFFICE 2,524,156

CURING TUBE PROTECTOR

Thomas P. Bacon, Jr., Oakland, Calif.

Application November 22, 1947, Serial No. 787,596

3 Claims. (Cl. 18—18)

1

This invention relates to curing tube protectors, and particularly to a device for protecting the pneumatic curing bag or tube during the vulcanizing operation on tires.

The primary object of the invention is to provide a device which prevents the tube from bulging over the edges of the curing rim, and prevents the cutting and wearing of the curing tube or bag, and also prevents injury to the sidewalls of the tire.

Particularly it is the object of the invention to provide a tube protector on a curing rim which fills the space around the edges of the curing rim so as to prevent the tube from being squeezed between the edges of said curing rim and the sidewalls of the tire; the said protector being firm enough to prevent bulging over of the curing tube and also being sufficiently flexible to adjust itself to the variations in the width of tires within the range of the average curing rim.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein;

Fig. 1 is a cross sectional view of my device on a curing rim in operative position within a tire during a recapping or retreading operation. Fig. 2 is a sectional view of a modified form of my device, and Fig. 3 is a sectional view of said modified form with the curing bag expanded.

Usually in recapping or retreading pneumatic tires, the tires are held in proper position for vulcanizing the rubber by so-called curing tubes or bags, which are pneumatic or pressure tubes. These tubes are placed within the tire casing and are inflated so as to expand against the inside of the sidewall and tread areas of the tire casing, thereby creating the internal pressure required to hold the rubber on the outside periphery of said tire casing in proper position for the vulcanizing operation. In order to direct the pressure of this pneumatic tube or bag to the desired areas and portions of the tire casing it was found necessary to place a band or ring, commonly referred to as curing ring, around the inside periphery of the curing tube so as to prevent the

2 pneumatic curing tube from expanding inwardly of the tire casing, and thereby directing the pressure of the curing tube outwardly toward the crown and sidewalls of the tire casing. The cross sectional shape of such curing ring is usually transversely dished in such a way as to substantially conform to the contour of the curing bag. It was found however that there is a variation in the clearance or space between the peripheral edges of the curing rim and the sidewalls of the tire because of the usual variation of the width or dimensions of used tires. As a result of this difference the clearance around the peripheral edges of the rim varies. Sometimes the variation reaches an extent of actually allowing considerable space between the inside of the tire walls and the peripheral edges of the curing rim. It is the tendency of the pneumatic tube under pressure to flow or crawl into this clearance or space around each peripheral edge of the rim and to bulge over the rim edges. The overflowing or bulging portions of the pneumatic tube around the rim edges are the frequent cause of cuts and wear of the pneumatic tube to such a degree as to cause premature tube failure and the necessity of replacement as well as the hindering of the recapping or retreading operation. This flowing or bulging action also results in the stretching of the pneumatic tube to a degree that due to the rim and clearance variations around the edges of the rim, the life of such curing tubes is considerably shortened.

For the herein illustration a tire casing 1 is represented diagrammatically in the drawings as it is positioned in a usual mold or matrix 2 for the vulcanizing or curing operation. In the inside of this tire casing is a curing rim 3. The aforesaid parts may be of any of the usual structures employed in vulcanizing tires. For the purpose of illustration the space or clearance 4 between the peripheral edges 5 of the rim 3 and the sidewalls of the tire casing 1 are shown as somewhat wide so as to illustrate an extreme condition that occurs in such operations. A pneumatic bag or tube 6 is within the tire casing 1 and bears against the dished periphery of the curing rim 3 so as to expand against the sidewalls and crown portion of the tire casing 1 for pressing the latter against the molding surfaces of the matrix for the vulcanizing operation. This pneumatic tube or bag has the tendency of bulging into the clearances or spaces 4 between the peripheral edges 5 of the curing edge 3 and the sidewalls of the tire casing 1.

My invention resides in the provision of a protector lining or flap 7 over the inside periphery of the curing bag 6, or over the dished outer periphery of the curing rim 3. The cross sectional shape of the lining 7 substantially conforms to the dishing of the curing rim 3, but it is somewhat wider and has circumferential wings 8 on each edge thereof which extend upwardly on opposite sides of the inner periphery of the curing bag. These wings 8 are firm but resiliently yieldable so that upon the inflation of the curing tube or bag the wings 8 are bent outwardly toward the sides of the tire casing. Upon any tendency of the curing bag to bulge toward and over the peripheral edges 5 of the curing rim 3, these wings 8 are stretched outwardly so that the outer points or edges thereof are in contact with the inner surfaces of the sidewalls of the tire casing. The larger the clearance or space around the peripheral edges of the curing rim, and the firmer the downward and outward pressure of the curing bag, the tighter becomes the contact between the outer edges of the wings 8 and the sidewalls of the tire casing. In this manner all the force of the curing bag is directed in the proper direction and it is prevented from bulging over the peripheral edges of the curing rim.

The protector lining or flap may be made of various materials which assure sufficient firmness and resiliently yieldable qualities for the purpose of conforming in spread to the variable spacing between the peripheral edges of the curing rim and the sidewalls of the tire rim in which they are used. For this purpose in the present illustration this protector lining or band is made of rubber, the side flaps or flanges of which are reinforced so as to form resiliently reinforced wings which are adapted by reason of the resiliency of the rubber to turn inwardly to conform to the shape around the inner periphery of the bag, but can pivot around the rubber portions outwardly into contact with the sidewalls of the tire.

The wings of the flap or liner as shown herein are comparatively thick so as to also brace against the peripheral edges of the curing rim, and taper outwardly to a comparatively thin peripheral edge, as shown, so that the support of the curing bag is further stiffened. In the event of the necessity to obstruct the space between the peripheral edges of the curing rim and the sidewalls of the casing, each wing fulcrums around the respective peripheral edges of the curing rim to yield outwardly and into contact with the sidewalls of the tire casing.

It is understood that the protector ring may be made so that the entire protector lining or flap may be reinforced with cord in such proportion so as to allow comparatively stiff resiliently yieldable wing structure. The protector flap or band may be made of other resilient materials such as for instance suitable spring steel which would allow the resilient action of the wings of the protector lining. Such spring steel could be padded if needed. These structures provide for the facility of slipping the protecting lining to the inner periphery of the curing bag before the curing rim is placed thereagainst and thereby having the lining conform to the inner periphery of the curing bag both in its inflated position as well as in its position under increased pressure when it begins to spread toward the sidewalls of the tire casing and for closing the clearance or spacing around the peripheral edges of the curing rim.

The device herein described protects the curing bag against undue stretching, as well as against rim abrasion and penetration and cuts, thereby greatly increases the period of usefulness of such curing bags. The flap or lining may be easily slipped over the inside periphery of the bag and with its particular wing structures it pads or fills the clearance or space between the rim surface and the bag so as to prevent the bulging over or crawling or stretching of the curing bag into such spaces or clearances. The device is simply constructed, it is very easily inserted and used, and it is eminently adapted for the purposes herein described.

A modified form of this invention is shown in Figs. 2 and 3. In this form a pair of circumferential wings 9 are integrally formed with and extend, one to each side, from the inner periphery of the curing bag in such a manner that as the bag is inflated these wings obstruct the opening or space between the edges of the rim and the tire casing, and pad that space so as to restrict the bag stretch to a minimum.

I claim:

1. In combination with an inflatable curing bag, and a curing rim for vulcanizing tire casings and the like, a tube protector ring, comprising a cross sectionally dished body fitting between the inner periphery of the curing bag and the outer periphery of said curing rim, resiliently yieldable wings extending from the opposite lateral edges of said protector ring beyond the lateral edges of said curing rim and substantially conforming to the outer periphery of said curing bag to be spread outwardly by the pressing and inflating of said curing bags over the space beyond the lateral edges of said curing rim.

2. In combination with an inflatable curing bag, and a curing rim for vulcanizing tire casings and the like, a tube protector ring, comprising a cross sectionally dished body fitting between the inner periphery of the curing bag and the outer periphery of said curing rim, resiliently yieldable wings extending from the opposite lateral edges of said protector ring beyond the lateral edges of said curing rim and substantially conforming to the outer periphery of said curing bag to be spread outwardly by the pressing and inflating of said curing bags over the space beyond the peripheral edges of said curing rim, each of said wings having a fulcrum shoulder thereon engaging the lateral edges of said curing rim around which said wings are turned when spread outwardly by said curing bag.

3. A curing bag protector, comprising resiliently yieldable peripheral wings extending outwardly from the inner periphery of said curing bag, for restricting the stretching of said bag, said wings being integrally united with said curing bag.

THOMAS P. BACON, JR.

REFERENCES CITED

The following references are of record in the file of this patent:

UNITED STATES PATENTS

| Number | Name | Date |
|---|---|---|
| 1,579,718 | Kuhlke | Apr. 6, 1926 |
| 1,677,042 | Moore | July 10, 1928 |
| 1,692,128 | Kilborn | Nov. 20, 1928 |
| 1,746,699 | Harrington | Feb. 11, 1930 |
| 1,751,392 | Burch | Mar. 18, 1930 |
| 2,267,243 | MacMillan | Dec. 23, 1941 |
| 2,370,972 | Kraft | Mar. 6, 1945 |

FOREIGN PATENTS

| Number | Country | Date |
|---|---|---|
| 221,331 | Great Britain | Sept. 11, 1924 |